(12) United States Patent
Larson et al.

(10) Patent No.: US 10,179,487 B1
(45) Date of Patent: Jan. 15, 2019

(54) METHOD FOR GENERATING IMAGES OF PREDICTED TIRE TREAD WEAR

(71) Applicant: Hunter Engineering Company, St. Louis, MO (US)

(72) Inventors: Timothy A. Larson, Ferguson, MO (US); Theresa M. Houska, Chesterfield, MO (US); Nicholas J. Colarelli, III, Frontenac, MO (US)

(73) Assignee: Hunter Engineering Company, St. Louis, MO (US)

( * ) Notice: Subject to any disclaimer, the term of this patent is extended or adjusted under 35 U.S.C. 154(b) by 0 days.

(21) Appl. No.: 15/405,164

(22) Filed: Jan. 12, 2017

Related U.S. Application Data (60) Provisional application No. 62/279,305, filed on Jan. 15, 2016.

(51) Int. Cl.
| | |
|---|---|
| *B60C 25/132* | (2006.01) |
| *B60C 99/00* | (2006.01) |
| *G06T 15/04* | (2011.01) |
| *G06T 15/20* | (2011.01) |
| *G06T 19/20* | (2011.01) |

(52) U.S. Cl.
CPC ............ *B60C 99/006* (2013.01); *G06T 15/04* (2013.01); *G06T 15/205* (2013.01); *G06T 19/20* (2013.01); *G06T 2200/04* (2013.01); *G06T 2200/08* (2013.01); *G06T 2200/24* (2013.01); *G06T 2210/22* (2013.01); *G06T 2215/16* (2013.01); *G06T 2219/2012* (2013.01)

(58) Field of Classification Search
None
See application file for complete search history.

(56) References Cited

U.S. PATENT DOCUMENTS

| | | | |
|---|---|---|---|
| 6,384,834 B1 * | 5/2002 | Watanabe | G06T 15/04 345/581 |
| 6,430,993 B1 * | 8/2002 | Seta | B60C 3/00 73/146 |
| 7,805,987 B1 * | 10/2010 | Smith | G01M 17/027 73/146.5 |
| 9,481,217 B2 * | 11/2016 | Iwasaki | G06F 17/5018 |
| 9,805,697 B1 * | 10/2017 | Dorrance | G09G 5/40 |
| 2004/0107081 A1 * | 6/2004 | Miyori | B60C 3/00 703/6 |
| 2007/0107506 A1 * | 5/2007 | Kishida | G06F 17/5018 73/146 |
| 2009/0308149 A1 * | 12/2009 | Kishida | G06F 17/5018 73/146 |
| 2010/0018628 A1 * | 1/2010 | Ueyoko | B60C 11/0306 156/64 |
| 2011/0126617 A1 * | 6/2011 | Bengoechea Apezteguia | B60C 23/068 73/146 |
| 2013/0271574 A1 * | 10/2013 | Dorrance | H04N 7/18 348/46 |

(Continued)

*Primary Examiner* — Martin Mushambo
(74) *Attorney, Agent, or Firm* — Sandberg Phoenix & von Gontard, P.C.

(57) ABSTRACT

A procedure for evaluating tire tread depth measurement data points acquired from a tread region on the surface of a tire in order to generate a representation of the tire tread region having an appearance of having been worn over time, so as to convey to a recipient a visual indication of potential tire tread wear at a point in time subsequent to the acquisition of the tire tread depth measurements.

18 Claims, 6 Drawing Sheets

(56) References Cited

U.S. PATENT DOCUMENTS

| | | | |
|---|---|---|---|
| 2013/0327135 A1* | 12/2013 | Russell | G01M 17/02 73/146.3 |
| 2015/0231932 A1* | 8/2015 | Singh | B60C 11/246 701/34.4 |
| 2016/0029006 A1* | 1/2016 | Zoken | G01B 11/24 348/50 |
| 2016/0033368 A1* | 2/2016 | Neau | G01M 17/027 702/34 |
| 2016/0221404 A1* | 8/2016 | Lee | B60C 11/246 |
| 2016/0343126 A1* | 11/2016 | Miller | G06T 7/0006 |
| 2017/0190223 A1* | 7/2017 | Fish | H04N 7/18 |

\* cited by examiner

METHOD FOR GENERATING IMAGES OF PREDICTED TIRE TREAD WEAR

CROSS-REFERENCE TO RELATED APPLICATIONS

The present application is related to, and claims priority from, U.S. Provisional Patent Application Ser. No. 62/279,305 filed on Jan. 15, 2016, and which is herein incorporated by reference.

STATEMENT REGARDING FEDERALLY SPONSORED RESEARCH

Not Applicable.

BACKGROUND OF THE INVENTION

The present application is related generally to tire tread depth measurement systems, and in particular, to a method for generating a display representative of potential tire wear or tread condition within a region on a tire tread surface, based in-part on measurements of tire tread depth previously acquired from the tread surface within the region.

Motor vehicles, such as passenger cars and trucks, rely upon wheel assemblies consisting of wheel rims with tires mounted thereon to maintain contact with the roadway surfaces over which the vehicle is traveling. It is well known that the condition of the tires of the wheel assemblies of a motor vehicle, and in particular, the condition of the tire tread surfaces, can have a significant impact on the performance of the vehicle as well as be indicative of potential problems with the vehicle. For example, tires with excessive tread wear (or insufficient tread depth) lack the ability to evacuate water from a contact patch region between the tire and roadway when traveling over wet surfaces, leaving the vehicle dangerously susceptible to hydroplaning and a loss of control. Uneven tread wear across the width of a tire's outer tread surface may be indicative of an improper wheel alignment or a broken component in the vehicle suspension system. Improper inflation of a tire can result in the failure of the tire to properly support the vehicle, leading to bulges in the tire sidewall adjacent to the contact patch, and excessive fuel consumption by the vehicle.

A wide variety of automatic or semi-automatic tire tread depth measurement systems are known. These include systems which optically acquire tire tread depth measurement data points along a single scan line or contour of tire tread, as well as systems which acquire tire tread depth measurement data points along multiple adjacent scan lines or contours sufficient to generate a surface map for a region of the tire tread surface. In either case, the acquired tire tread depth measurement data points are representative of the tire tread depth at the observed locations on the tire tread surfaces at the time of the scan.

Tires, however, are not static components of a vehicle, and are continually being worn away during use, reducing the height of various features on the tread surface. For a given measurement of tire tread depth, industry known standard estimates for tread wear rates based on driven mileage can be used to determine or predict a point in time (or number of miles driven) when the tire will require replacement. Conveying this information in a meaningful manner to a vehicle owner can be difficult. Simply providing a vehicle owner with a numerical number representative of an estimated remaining tire tread depth or a "tire replacement due at 15,000 miles" reminder often fails to motivate the vehicle owner to take necessary actions to inspect or replace the tires. Accordingly, a more compelling method for communicating tire tread wear progression to a vehicle owner would be advantageous to encourage regular inspection and proper replacement of worn tires in a timely manner.

BRIEF SUMMARY OF THE INVENTION

Briefly stated, the present disclosure sets forth a procedure by which a three-dimensional perspective image of a tire tread surface region generated from actual measurements of tire tread depths is utilized to generate a visual representation of expected tire tread wear over a period of time, using image manipulation techniques. The three-dimensional perspective image of the tire tread surface region is provided as an initial input to at least one image filter configured to selectively alter a characteristic of either individual image pixels or groups of image pixels from the input image to generate an output of a three-dimensional perspective image representative of worn regions of tire tread. The altered characteristic is selected from a set of characteristics including brightness, color, contrast, smoothness, and represented height. The resulting visual representation of tread wear over the period of time is subsequently displayed as an altered three-dimensional perspective image of the tire tread surface regions in conjunction with the original three-dimensional perspective image of the same tire tread surface regions.

In an alternate procedure of the present disclosure, a three-dimensional perspective image of a tire tread surface region, illustrating an effect of tread wear over a period of time, is generated directly from actual measurements of tire tread depths within the tire tread surface region. The actual measurements acquired from the tire tread surface region are selectively processed to produce a set of "worn" tire tread depth measurements from which an associated three-dimensional perspective image is generated. The selective processing of the actual tire tread measurements is configured to reduce height variations between tread features within the tread surface region by lowering raised tread features to simulate an effect of tire tread wear. The resulting visual representations of tread wear on the tire tread surface over a period of time are subsequently displayed as a three-dimensional perspective image of the tire tread surface region.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

It will be understood that the procedures and methods of the present disclosure are not limited to use with any specific type of vehicle service equipment. Systems having sufficient computational capacity and functionality to carry out the necessary software instructions may be adapted to implement the procedures described herein. Within an automotive service environment, tire tread depth measurements are typically acquired using a system such as a drive-over tire tread depth measurement system, a suitably configured wheel balancer, a suitably configured tire changer, or a hand-held tire tread depth measurement device. The specific source of the tire tread depth measurement data points is not critical to the procedures and methods described herein, which will function equally well utilizing "current" tire tread depth measurement data received from an appropriate measurement system, as well as "stored" tire tread depth measurement data retrieved from an electronic storage or database, provided a sufficient number of tire tread depth measurement data points, such as may be found in a point cloud, are available from which a three-dimensional perspective image of the tire tread surface can be generated. In one exemplary configuration, an automotive service center management system implements the procedures of the present disclosure using a point cloud of "current" tire tread depth measurement data points to assist a service representative in conveying tire tread wear progression information to a vehicle owner, such as during a vehicle inspection, as well as recalling a "stored" point cloud of tire tread depth measurement data points to prepare reminders or customized advertisements to be mailed or delivered to a vehicle owner at a subsequent point in time.

Figure 1:
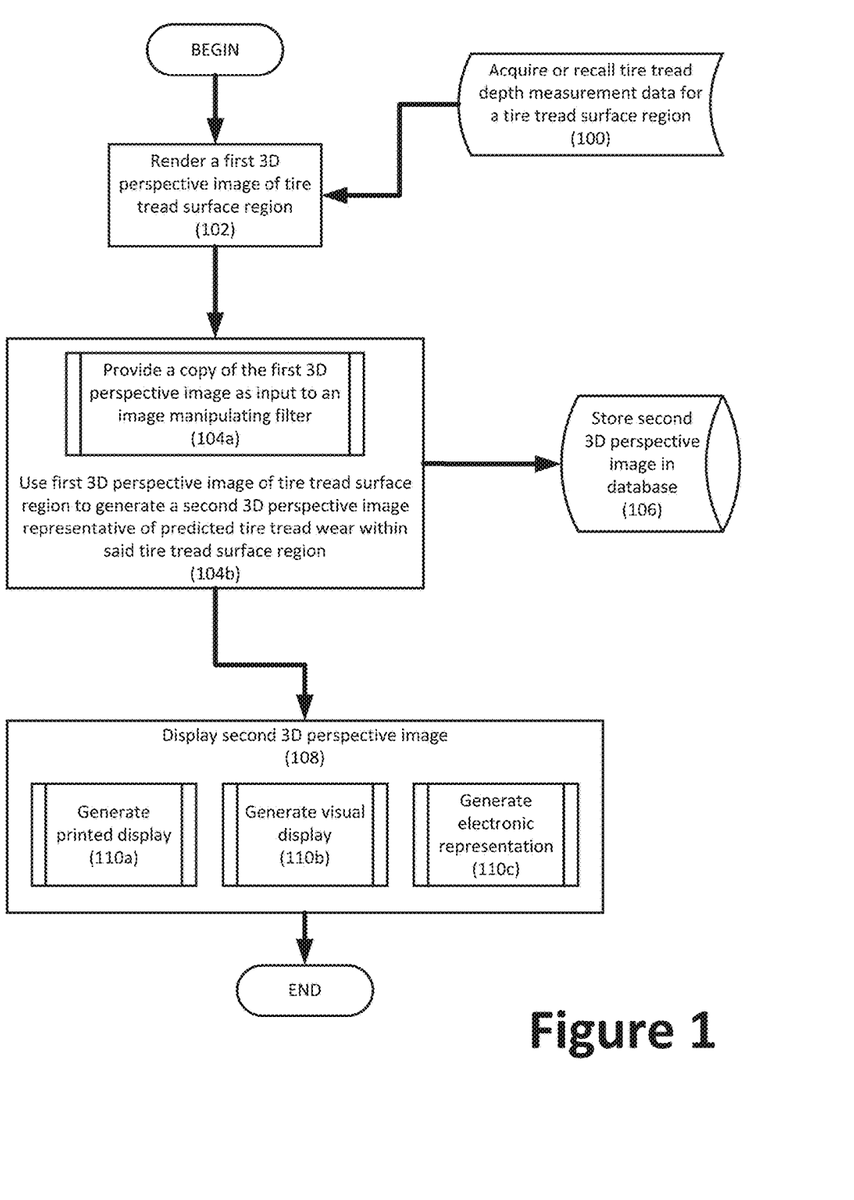
FIG. 1 is a flow chart illustrating a procedure for generating illustrations such as shown in FIGS. 3, 4, 6 and 7 from illustrations such as shown in FIGS. 2 and 5.
Figure 2:
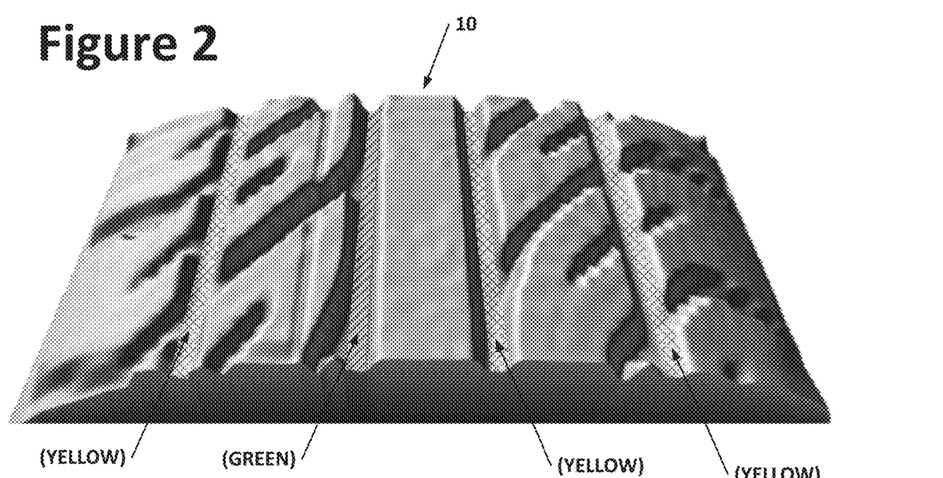
FIG. 2 is a perspective colored illustration of a region on a tire tread surface generated from actual tire tread depth measurements, wherein the indicated colors are representative of tread depths.
Figure 3:
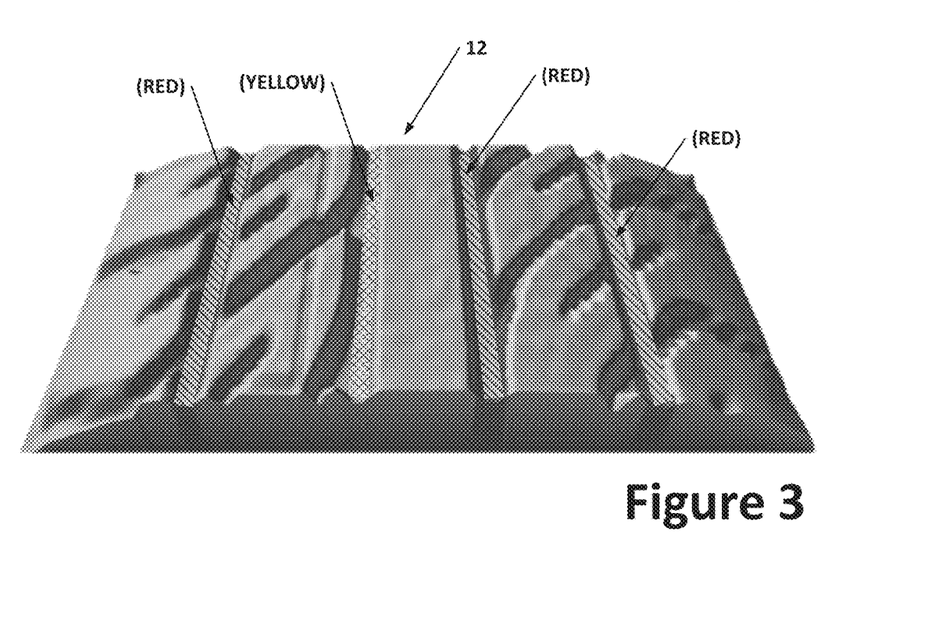
FIG. 3 is a perspective colored illustration of the region shown in FIG. 2, altered by image manipulation procedures to mimic the effect of additional tread wear, wherein the indicated colors are representative of tread depths.
Figure 4:
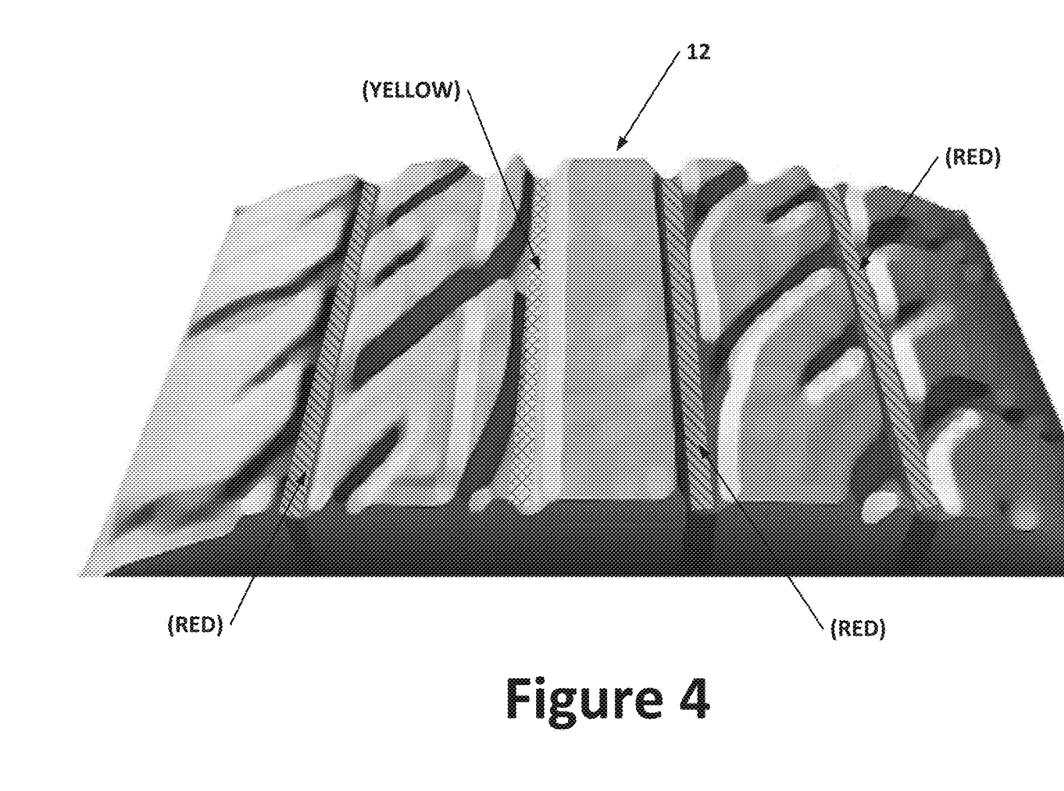
FIG. 4 is a perspective colored illustration of the region shown in FIG. 2, altered by the application of an image filter to mimic the effect of additional tread wear, wherein the indicated colors are representative of tread depths.
Figure 5:
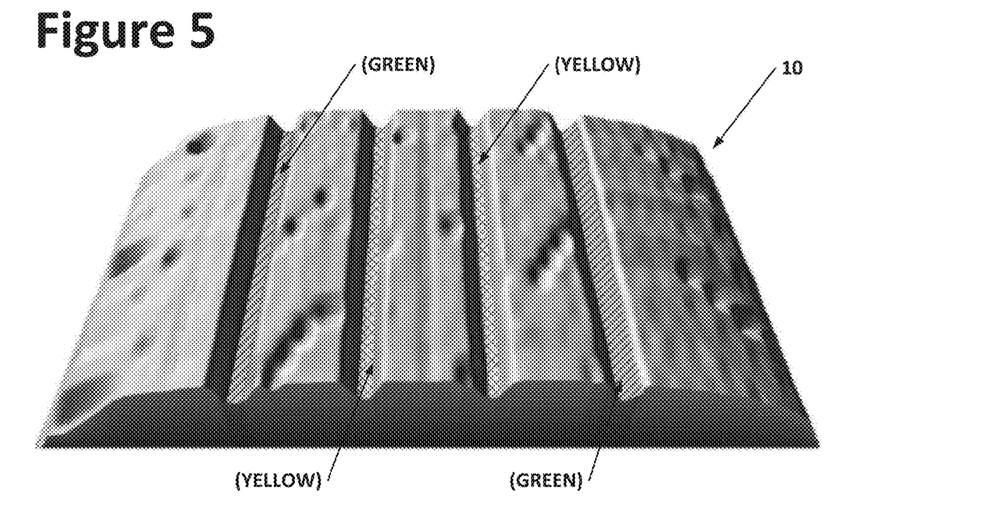
FIG. 5 is a perspective colored illustration of a region on tire tread surfaces generated from actual tire tread depth measurements, wherein the indicated colors are representative of tread depths.

Turning to the figures, and to FIGS. 2-7 in particular, three-dimensional perspective images of tire tread surface regions are shown. The images may be representative of a single tread regions from an individual tire, of multiple tread regions from a single tire, or may be representative of single tread regions from multiple tires, such as may be mounted on the wheel assemblies of a vehicle undergoing inspection or service. Utilizing a procedure as illustrated in the flowchart of FIG. 1, actual tire tread depth measurements for a region on a tire tread surface are acquired (at Box 100) either directly by any suitable tread depth measurement system, or are recalled from data storage. The actual tire tread depth measurements are utilized to first render (at Box 102) one or more three-dimensional perspective images 10, which are representative of the actual tire tread features and tread depths within the measured region of the tire surface. Exemplary three-dimensional perspective images 10 are shown in FIGS. 2 and 5.

Figure 6:
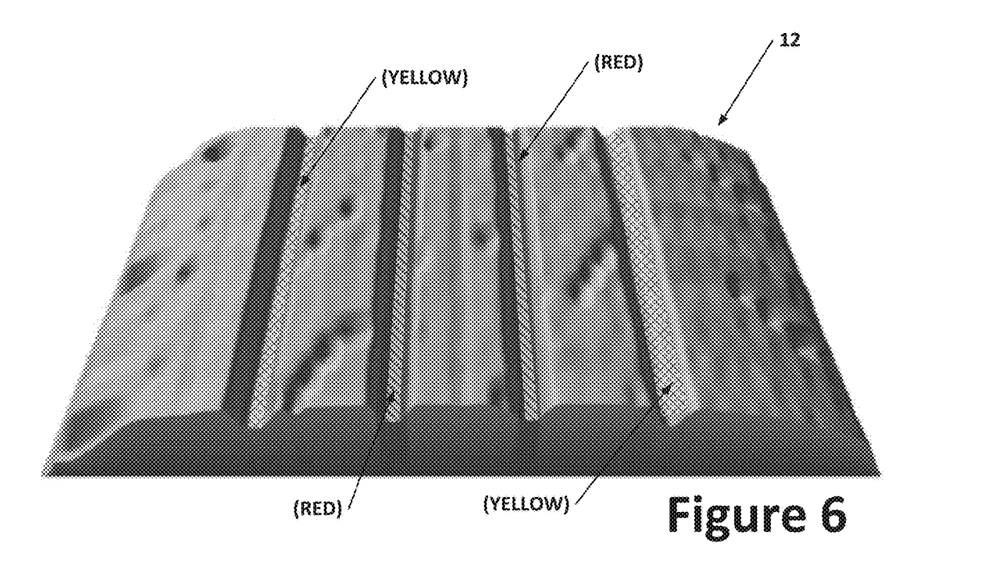
FIG. 6 is a perspective colored illustration of the region shown in FIG. 5, altered by image manipulation procedures to mimic the effect of additional tread wear, wherein the indicated colors are representative of tread depths.

To present the vehicle owner or an operator with one or more images 12 illustrating predicted changes to the tire tread surface regions 10 over time due to tread wear, the generated three-dimensional perspective image 10, or a copy there-of, is utilized as an input or starting point to an image manipulation algorithm (i.e., an image manipulation filter) (Box 104a). The image manipulation algorithm or filter (Box 104b) selectively alters individual pixel elements which illustrate characteristics or visible tire tread surface features shown in the initial image 10 to generate, as described herein, a second three-dimensional perspective image 12 representative of an effect of tread wear on the actual tire tread surface region shown in the initial image 10. FIG. 3 is representative of a generated image of a tire tread surface using the image of FIG. 2 as input. Similarly, FIG. 6 is representative of a generated image of a tire tread surface using the image of FIG. 5 as input. The generated second three-dimensional perspective image 12 is then conveyed to an intended recipient in a suitable manner. For example, the image 12 may be stored in a suitable data storage for future use, (Box 106) and/or displayed to the vehicle owner or operator on a display screen as a visual indication of what the tire will look like after a period of continued usage (Box 108).

A display of the generated image 12 may be communicated to the recipient by printing (Box 110a), such as in a vehicle condition report, marketing material, or advertisement, may be presented visually (Box 110b), such as within a graphical user interface displayed on a display screen, on a cellular phone or other portable computing device, (or may be presented as a static image within an electronic communication such as an e-mail or text message (Box 110c). Optionally, the second generated image 12 is recalled at a later point in time, from images stored in the accessible database (Box 106), and communicated to the vehicle owner or operator as an advertisement or reminder to check the then-current condition of the tires which are expected to have reached the illustrated level of tread wear, possibly necessitating replacement. With these procedures, it is not necessary to know the precise rate at which a tire tread will wear based on mileage, as the resulting generated image 12 is a visual representation of a worn tire surface region, and is not intended as an accurate measure of true tire tread wear.

In order to generate the image 12 representative of future or predicted tire wear, one or more image manipulation filters are utilized to selectively alter the characteristics or visible tire tread surface features present in the initial rendered image (10) to simulate the appearance of an aged or worn tire tread surface. As used herein, an image manipulation filter is understood to be any graphics processing tool utilized to alter the properties of an image, such as by processing individual pixels within the image through a selected algorithm to achieve a desired result An exemplary combination of image filters includes an image brightness-altering image manipulation filter to alter the brightness level for individual pixels within the images (altering brightness results in an "aged" appearance), a contrast altering image manipulation filter to alter the overall contrast between light and dark regions of the images (altering contrast results in changes in the visual appearance of tread groove shadows), and a color altering image manipulation filter to selectively shift colors representative of actual tread depths (such as green to indicate acceptable, and yellow to indicate marginal, as seen in FIGS. 2 and 5) towards colors representative of shallower tread depths (i.e., green to yellow, yellow to red, indicating unacceptable, as seen in FIGS. 3 and 6).

Additional image manipulation filters which may be used alone, or in a combination with other filters, include an image manipulation filter to compress, crop, or mask the image in order to reduce the overall "height" represented by the rendered tire tread, an image manipulation filter to alter a perspective view of the tire tread surface, a surface smoothing image manipulation filter to "round off" sharp edges and transitions between tire tread features, and an image scale manipulation filter applied along one or more axes of the generated images to compress tire tread features and reduce the depth of visible tread grooves. For example, FIG. 3 illustrates a three-dimensional perspective image generated by applying, in no specific order, a brightness enhancing image manipulation filter, a color shifting image manipulation filter, and a contrast reduction image manipulation filter to the image of FIG. 2, which was initially generated from actual tire tread depth measurement data. In addition, the top edge of the resulting image was selectively cropped to reduce the visual appearance of overall height. The resulting images shown in FIG. 3 lacks the sharp edges seen in FIG. 2, and generally appears as if the illustrated tire tread surface has worn, with the remaining tread grooves exhibiting a shallower depth appearance and highlighted in yellow and red, indicating the remaining tread depths are marginal or are below an acceptable limit.

Figure 7:
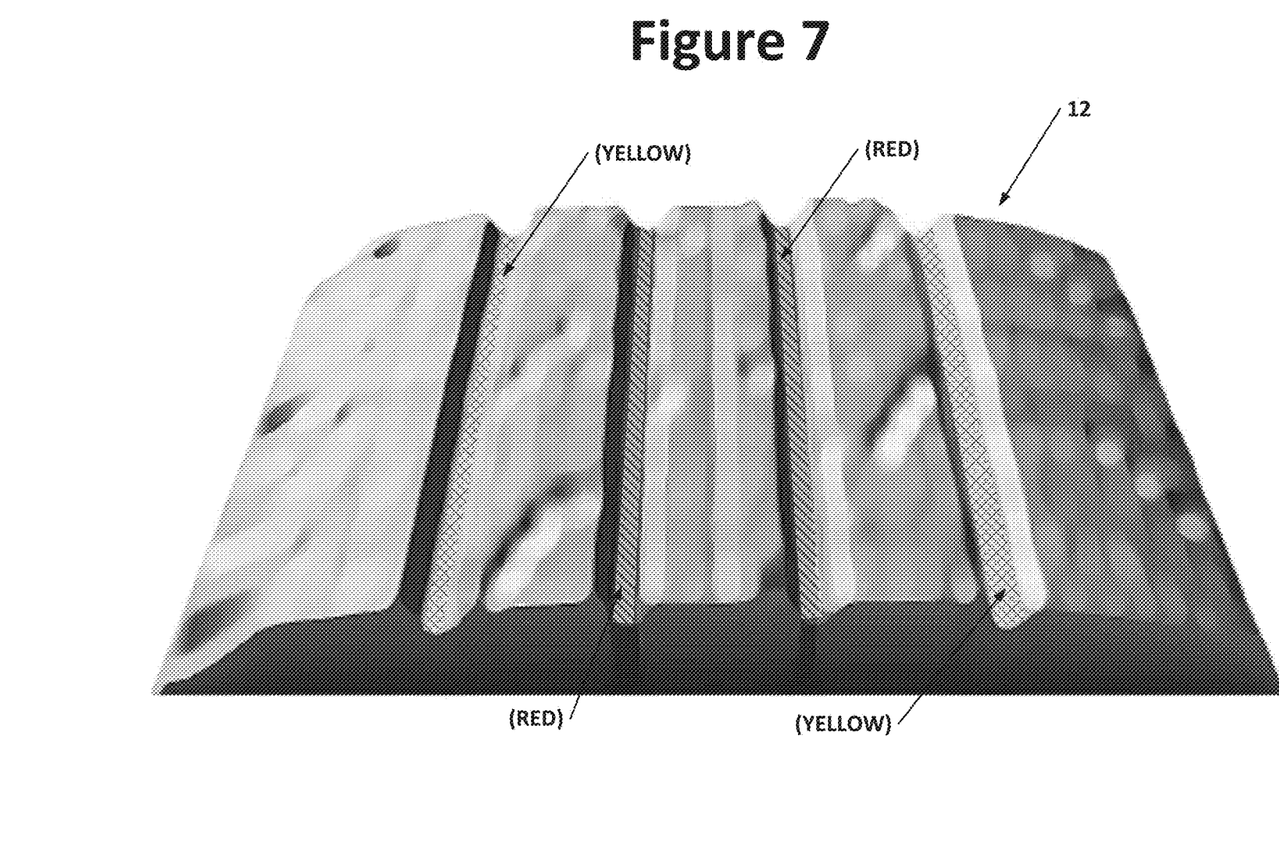
FIG. 7 is a perspective colored illustration of the region shown in FIG. 5, altered by the application of an image filter to mimic the effect of additional tread wear, wherein the indicated colors are representative of tread depths.

As an alternative to generating a tire tread wear image 12 by applying individual filters to an initial image 10 of an actual tire tread surface, an artistic image manipulation filter may be utilized to achieve a visual appearance of a worn or aged tired surface having reduced tire tread depths. For example, a Paint Daubs image manipulation filter is utilized to alter the appearance of patches of pixels (corresponding to paint brush strokes) within an input image 10 of a tire tread surface region to generate an image representative of a worn tire tread surface, such as shown in FIG. 4, generated from an input image as shown in FIG. 2, and FIG. 7 generated from an input image as shown in FIG. 5.

Figure 8:
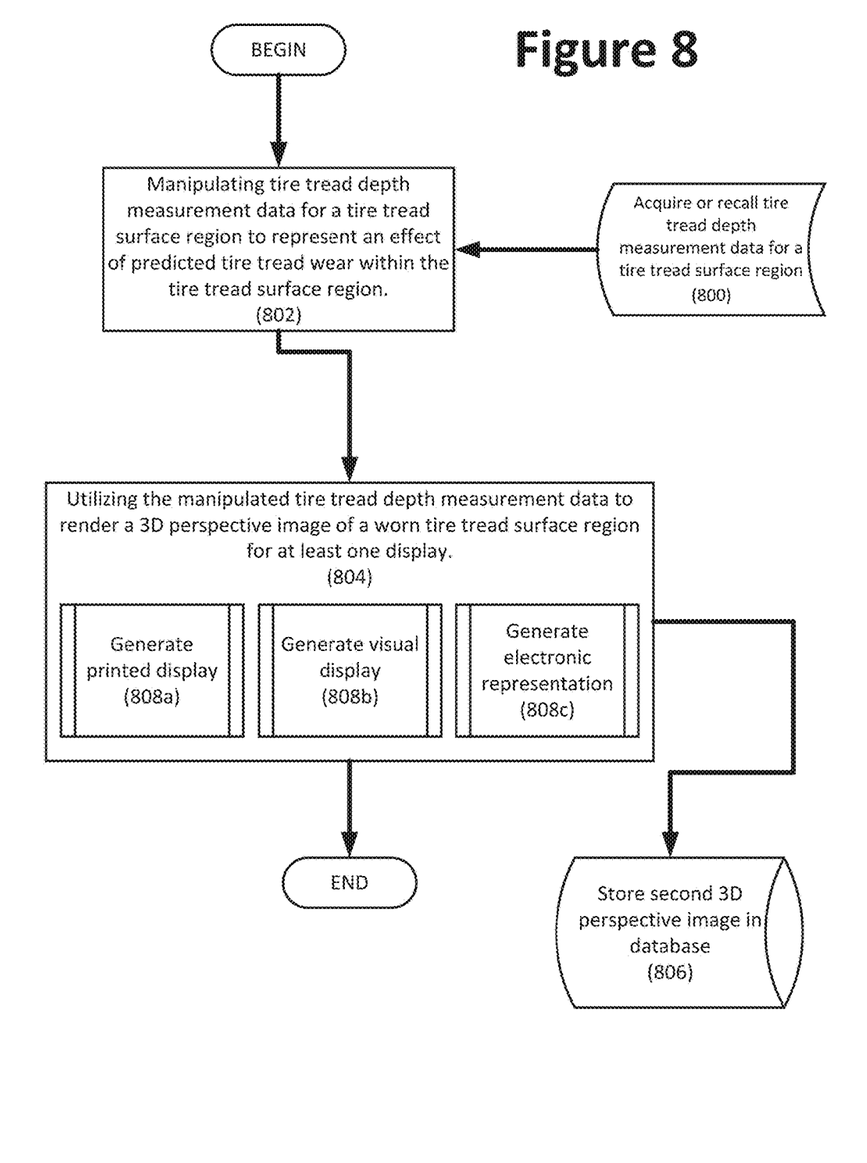
FIG. 8 is a flow chart illustrating a procedure for generating, directly from actual tire tread depth measurements, illustrations representative of tread wear effects on a measured tire tread surface.

In a further alternative procedure of the present disclosure, shown in FIG. 8, no initial image representing the current tire conditions is rendered from the actual measured or recalled tire tread depth measurements. Rather, actual tire tread depth measurements acquired from a vehicle wheel, or recalled from data storage (Box 800) are utilized to directly render a three-dimensional perspective image representative of how a tire having the actual tire tread depth measurements will appear following a period of continued usage and wear. To render an image illustrating changes to the measured tire tread surface regions over time due to tread wear, the actual tire tread depth measurements may be altered or manipulated (Box 802) to simulate the effects of tire wear. Exemplary alterations or manipulations may include image manipulation filters to sub-sample the available tire tread depth measurement data point cloud to reduce measurement resolution, an image manipulation filter to decreasing a height value for measured tire tread surface features, and/or a smoothing image manipulation filter to alter pixels representative of tire tread features so as to smooth out abrupt vertical transitions between adjacent tire surface features. Alternatively, the tire tread depth measurements remain unaltered, and a subsequently rendered image thereof is rendered directly with a set of image characteristics such as brightness, contrast, and colors, selected to provide a visual appearance of a worn tire tread surface region.

To present the vehicle owner or an operator with one or more images 12 illustrating predicted changes to the tire tread surface regions 10 over time due to tread wear, the tire tread depth measurement data is utilized to directly render a three-dimensional representation of a worn tire tread surface region (Box 804). The rendered three-dimensional perspective image representative of an effect of tread wear on the actual tire tread depth measurements acquired or recalled (Box 800) and manipulated to simulate tire tread wear (Box 802). The generated three-dimensional perspective image is conveyed to a recipient in a suitable manner. For example, the image may be communicated to, and stored in, a suitable data storage for future use, (Box 806) and/or communicated to a graphical user interface for display to the vehicle owner or operator as a visual indication of what the tire will look like after a period of continued usage.

A display of the generated image 12 may be communicated to a recipient by printing (Box 808a), such as in a vehicle condition report, marketing material, or advertisement, may be presented visually (Box 808b), such as within a graphical user interface viewed on a display screen, on a cellular phone or other portable device, or may be presented as a static image within an electronic communication such as an e-mail or text message (Box 808c). Optionally, the generated image is recalled at a later point in time, from images stored in the accessible database (Box 806), and communicated to the vehicle owner or operator as an advertisement or reminder to check the then-current condition of the tires which are expected to have reached the illustrated level of tread wear, possibly necessitating replacement. As with the procedure of FIG. 1, it is not necessary to know the precise rate at which a tire tread will wear based on mileage, as the rendered image is a visual representation of a worn tire surface region, and is not intended as an accurate measure of true tire tread wear.

The present disclosure can be embodied in-part in the form of computer-implemented processes and apparatus for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for generating a representation of a tire tread surface with tire tread wear progression, comprising:
   acquiring a plurality of tire tread depth measurement data points from a vehicle wheel assembly consisting of a tire mounted to a wheel rim, said tire tread depth measurement data points establishing a point cloud representative of tire tread depths within a surface region on a tread of said tire;
   processing said acquired tire tread depth measurement data points to render a first three-dimensional perspective image of said surface region of the tire tread surface, said first three-dimensional perspective image including a plurality of discrete pixel elements with one or more characteristics selected to visually illustrate tire tread depths within said surface region of the tire tread surface;
   providing a copy of said first three-dimensional perspective image as an initial input to at least one image filter, said at least one image filter configured to selectively alter said one or more characteristics of a plurality of individual pixel elements within said initial input image to generate, at least one image filter output, a second three-dimensional perspective image including a plurality of discrete pixel elements with one or more characteristics visually illustrating an appearance of said surface region of said tire tread surface with simulated tread wear having reduced said tire tread depths; and
   generating a display of at least said second three-dimensional perspective image to illustrate a tread worn appearance of said region within said tire tread.

2. The method of claim 1 wherein said image filter is a surface smoothing image manipulation filter, said surface smoothing image manipulation filter altering said one or more characteristics of a plurality of individual pixel elements within said initial input to smoothing transitions between surface features in order to generate said output representative of said second three-dimensional perspective image.

3. The method of claim 1 wherein said image filter is a height compression image manipulation filter, said height compression image manipulation filter altering said one or more characteristics of a plurality of individual pixel elements within said initial input to reduce a height of at least one surface features represented within said initial input, and to generate said output representative of said second three-dimensional perspective image.

4. The method of claim 1 wherein said image filter is a brightness-altering image manipulation filter, said brightness-altering image manipulation filter altering a brightness characteristic value for at least one pixel contained within said initial input to generate said output representative of said second three-dimensional perspective image.

5. The method of claim 1 wherein said image filter is a contrast altering image manipulation filter, said contrast altering image manipulation filter altering a contrast level characteristic associated with said pixel elements of said initial input to generate said output representative of said second three-dimensional perspective image.

6. The method of claim 1 wherein said step of processing said acquired tire tread depth measurement data points to render said first three-dimensional perspective image includes selectively setting a color characteristic of at least some pixel elements within said first three-dimensional perspective image to visually represent measured tire tread depths within said surface region of the tire tread surface; and
   wherein said image filter is a color-shifting filter, said color shifting filter selectively changing pixel color characteristics within said input image representative of measured tire tread depths to visually represent shallower tire tread depths within said output representative of said second three-dimensional perspective image.

7. The method of claim 6 wherein said colors are representative of ranges of tire tread depths, said ranges including at least an acceptable range of tire tread depths, a marginal range of tire tread depths, and an unacceptable range of tire tread depths; and
   wherein said color shifting filter changes a pixel color characteristic initially representative of said acceptable range into a pixel color characteristic representative of said marginal range, and a pixel characteristic initially representative of said marginal range into a pixel color characteristic representative of said unacceptable range.

8. The method of claim 1 wherein said image filter is a cropping image manipulation filter configured to selectively crop pixel elements from at least one edge of said input image to generate said output representative of said second three-dimensional perspective image.

9. The method of claim 1 wherein said at least one image filter is a sequence of individual image filters, each individual image filter receiving as input either said initial input image or an output from a preceding image filter within said sequence.

10. The method of claim 1 wherein said step of generating a display includes presenting a display of said first three-dimensional perspective image in association with said second three-dimensional perspective image.

11. The method of claim 10 wherein said second three-dimensional perspective image is identified within said presented display as prediction of tire tread wear over a period of time for the region of the tire tread surface illustrated by the first three-dimensional image.

12. The method of claim 11 wherein said period of time corresponds to a span of time between the acquisition of said plurality of tire tread depth measurement data points and a current point in time, whereby said second three-dimensional perspective image is identified within said presented display as a predicted current condition of said tire tread depths within said surface region on said tire tread.

13. The method of claim 11 wherein said period of time corresponds to a selected span of time following the acquisition of said plurality of tire tread depth measurement data points.

14. The method of claim 1 wherein said step of generating, from said first three-dimensional perspective image, a second three-dimensional perspective image representative of tire tread depths within said surface region of said tire tread includes configuring said image filter for increasing a brightness characteristic of a plurality of pixel elements within said copy, decreasing a contrast level characteristic within said copy, and cropping pixel elements from at least one edge of said copy, to generate said second three-dimensional perspective image.

15. A method for establishing a visual representation of a predicted tire tread wear condition associated with a tire of a vehicle wheel assembly, comprising:

acquiring a point cloud of tire tread depth measurement data points representative of depths of tread features located within an observed region on a tire tread surface, said tread features including tread grooves and raised features having associated depth measurements;

altering said associated depth measurements for at least a portion of said acquired tire tread depth measurement data points representative of raised features within said observed region in accordance with a predicted effect of tire tread wear; and utilizing said altered tire tread depth measurement data points, together with any remaining unaltered tire tread depth measurement data points, to generate a three-dimensional perspective image depicting said observed region on said tire tread surface, said three-dimensional perspective image visually illustrating a predicted effect of tire tread wear on said raised features of said tire tread surface within said observed region.

16. The method of claim 15 wherein said step of acquiring retrieves said point cloud of tire tread depth measurement data points from an accessible database of stored tire tread depth measurement records.

17. The method of claim 15 wherein said step of acquiring receives said point cloud of tire tread depth measurement data points from a drive-over tire tread depth measurement system.

18. The method of claim 15 wherein said three-dimensional perspective image is conveyed to a recipient in a printed document, is presented to a recipient within a graphical user interface, or is communicated to a recipient within an electronic communication.

\* \* \* \* \*